United States Patent
Miyagawa et al.

(10) Patent No.: US 7,822,383 B2
(45) Date of Patent: Oct. 26, 2010

(54) SEMICONDUCTOR INTEGRATED CIRCUIT AND WIRELESS COMMUNICATION DEVICE

(75) Inventors: Yoichi Miyagawa, Kanagawa (JP); Mamoru Suzuki, Kanagawa (JP); Kazuyoshi Enomoto, Tokyo (JP); Yuko Yoshida, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 881 days.

(21) Appl. No.: 10/577,727

(22) PCT Filed: Aug. 23, 2005

(86) PCT No.: PCT/JP2005/015260

§ 371 (c)(1),
(2), (4) Date: May 2, 2006

(87) PCT Pub. No.: WO2006/025229

PCT Pub. Date: Mar. 9, 2006

(65) Prior Publication Data

US 2008/0280648 A1 Nov. 13, 2008

(30) Foreign Application Priority Data

Sep. 2, 2004 (JP) ............................. 2004-255183

(51) Int. Cl.
*H04B 7/00* (2006.01)
*H04B 1/28* (2006.01)
*H04B 1/38* (2006.01)

(52) U.S. Cl. .................. 455/39; 455/41.2; 455/333; 455/558; 340/10.1

(58) Field of Classification Search ....... 455/41.1–41.3, 455/558, 333; 340/10.1, 10.34, 10.42–10.52, 340/572.1

See application file for complete search history.

(56) References Cited

U.S. PATENT DOCUMENTS 6,400,274 B1 6/2002 Duan et al.

(Continued)

FOREIGN PATENT DOCUMENTS

JP  11-215026  8/1999

(Continued)

OTHER PUBLICATIONS

"Near Field Communication PN511-Transmission Module", Phillips Semiconductors, Short Form Specification, Objective Specification Rev. 2.0, XP007900762, Feb. 1, 2004, pp. 1-18.

(Continued)

*Primary Examiner*—Simon D Nguyen
(74) *Attorney, Agent, or Firm*—Oblon, Spivak, McClelland, Maier & Neustadt, L.L.P.

(57) ABSTRACT

The present invention relates to a semiconductor integrated circuit and a wireless communication apparatus that can be reduced in size without deteriorating a receiving sensitivity and a transmission efficiency. Communication with an external reader/writer and an external non-contact IC card is carried out through a common antenna 211. The signal received from the external reader/writer or the external non-contact IC card through the antenna is supplied to an ASK demodulation circuit 149 and demodulated. The signal received from the external reader/writer is full-wave rectified and smoothed by an full-wave rectification and smoothing circuit composed of diodes 231, 232 and a capacitor 233, and the power obtained from the full-wave rectified and smoothed signal is supplied to respective units of a semiconductor integrated circuit 101. The present invention can be applied to a mobile phone.

10 Claims, 10 Drawing Sheets

U.S. PATENT DOCUMENTS

| | | | |
|---|---|---|---|
| 6,737,884 B2 * | 5/2004 | Shigemasa et al. | 326/38 |
| 6,747,548 B1 * | 6/2004 | Yamaguchi | 340/10.51 |
| 6,809,952 B2 * | 10/2004 | Masui | 365/145 |
| 6,831,378 B2 * | 12/2004 | Watanabe et al. | 307/149 |
| 7,016,432 B2 * | 3/2006 | Arisawa | 375/297 |
| 7,138,699 B2 * | 11/2006 | Nakane et al. | 257/497 |
| 7,215,978 B2 * | 5/2007 | Hasegawa | 455/558 |
| 7,218,204 B2 * | 5/2007 | Hayashi | 340/10.34 |
| 2003/0020525 A1 * | 1/2003 | Shigemasa et al. | 327/143 |
| 2005/0009564 A1 * | 1/2005 | Hayaashi et al. | 455/558 |
| 2009/0237144 A1 * | 9/2009 | Arisawa et al. | 327/530 |

FOREIGN PATENT DOCUMENTS

| | | |
|---|---|---|
| JP | 2002-353852 | 12/2002 |
| JP | 2003-036427 | 2/2003 |
| JP | 2003-244014 | 8/2003 |
| JP | 2004-151750 | 5/2004 |
| JP | 2004-222120 | 8/2004 |

OTHER PUBLICATIONS

Japanese Office Action issued Jun. 3, 2010 in corresponding Japanese Patent Application JP2004-255183.

* cited by examiner

SEMICONDUCTOR INTEGRATED CIRCUIT AND WIRELESS COMMUNICATION DEVICE

TECHNICAL FIELD

The present invention relates to a semiconductor integrated circuit and a wireless communication apparatus, and to a semiconductor integrated circuit having a function of a non-contact IC card and a reader/writer for the non-contact IC card and to a wireless communication apparatus.

BACKGROUND ART

Recently, a management system of commuter pass information and electronic money information that makes use of a non-contact IC card is becoming widespread, and, a user can, for example, pass through a ticket gate only by causing a non-contact IC card, in which commuter pass information is stored, to approach a ticket-check machine or can make payment for a commodity using electronic money only by causing a non-contact IC card, in which electronic money information is stored, to approach a wireless reader/writer.

Incidentally, a mobile phone is one of goods carried by the user at all times, and, recently, a mobile phone provided with the non-contact IC card function described above is commercially available. The user can not only make various types of communication such as phone call, e-mail, and the like but also pass through a ticket gate or make a payment for a commodity making use the mobile phone, which is very convenient.

Further, it is also proposed to provide a terminal such as a mobile phone and the like with a wireless reader/writer (hereinafter, simply referred to as reader/writer) function for non-contact IC card, in addition to a non-contact IC card function (refer to, for example, Patent Document 1). With this arrangement, a user can not only cause an external reader/writer to read predetermined data from the mobile phone but also rewrite the information stored in an external non-contact IC card by making use of the reader/writer mounted on the mobile phone.

When the terminal such as the mobile phone and the like is provided with both the non-contact IC card function and the reader/writer function, it is contemplated to realize both the functions by an LSI (Large Scale Integration) for non-contact IC card and an LSI for reader/writer each composed of a different chip or to realize the both functions by an LSI composed of one chip having both the functions.

FIG. 1 shows a constitutional example of a non-contact IC card reader/writer 1 composed of a one chip LSI having both the non-contact IC card function and the reader/writer function. The non-contact IC card reader/writer 1 is composed of a semiconductor integrated circuit 11 and two antennas 12 and 13. The semiconductor integrated circuit 11 has a non-contact IC card circuit 21, a reader/writer transmitter circuit 22, and a reader/writer receiver circuit 23. The antenna 12 has a resonant circuit composed of a loop coil 31 and a capacitor 32.

FIG. 2 shows a constitutional example of a front end of an analog circuit of the non-contact IC card circuit 21 (hereinafter, referred to as analog front end) of FIG. 1.

An electromagnetic wave transmitted from a not shown external wireless reader/writer (hereinafter, referred to as external reader/writer) is received by the antenna 12 and converted into an electric signal (hereinafter, referred to as external reader/writer transmission signal). The external reader/writer transmission signal is half-wave rectified and smoothed by a half-wave rectification and smoothing circuit composed of a diode 41 and a capacitor 42. The data transmitted from the external reader/writer is obtained based on the half-wave rectified and smoothed external reader/writer transmission signal as well as the power obtained from the thus rectified and smoothed transmission signal is stabilized and made to a predetermined direct current by a clamp circuit 43 and a voltage regulator (Reg) 45 and supplied to the respective units of the semiconductor integrated circuit 11 as a power source.

Further, the external reader/writer transmission signal is supplied to a carrier detection circuit 46 and a clock extraction circuit 47. The carrier detection circuit 46 detects whether or not an electromagnetic wave (carrier wave) is radiated from the external reader/writer, that is, whether or not the external reader/writer is caused to approach the non-contact IC card reader/writer 1 based on whether or not the external reader/writer transmission signal is supplied from the antenna 12 and supplies a signal showing a result of detection to the respective units of the semiconductor integrated circuit 11. The clock extraction circuit 47 extracts a clock component from the external reader/writer transmission signal and supplies the extracted clock component to the respective units of the semiconductor integrated circuit 11 as a clock signal.

Further, the non-contact IC card circuit 21 transmits data to the external reader/writer by changing the load of an antenna of the external reader/writer that is electromagnetically coupled through the antenna 12 by turning on or off a switch disposed in a load switch 43.

As described above, the analog front end of the non-contact IC card circuit 21 constitutes an asymmetric circuit with respect to the antenna 12.

Returning to FIG. 1, the reader/writer transmitter circuit 22 modulates a transmission carrier signal having a predetermined frequency according to data to be transmitted to a not shown non-contact IC card located to the outside (hereinafter, referred to as external non-contact IC card) and transmits the modulated signal to the external non-contact IC card through the antenna 13.

The reader/writer transmitter circuit 22 is differentially driven at both the ends of the antenna 13 to effectively transmit the signal to the external non-contact IC card with a less amount of power. Specifically, the reader/writer transmitter circuit 22 outputs a signal obtained by superimposing the transmission carrier signal with the transmission data from an output terminal TP as well as output an inverted-phase signal, which is obtained by inverting the polarity of the signal output from the output terminal TP, from an output terminal TM.

The reader/writer receiver circuit 23 receives a response signal transmitted from the external non-contact IC card and obtains received data by demodulating the data of the signal. Since the reader/writer receiver circuit 23 must capture a minute variation of a magnetic field resulting from the modulation of the load of the external non-contact IC card, it obtains the response signal by the differential voltage between the both the ends of the antenna 13.

Accordingly, the not shown analog front ends of the reader/writer transmitter circuit 22 and the reader/writer receiver circuit 23 are arranged as asymmetric circuit with respect to the antenna 13.

Further, also in the invention according to Patent Document 1, an analog front end of a non-contact IC card portion is composed of a half-wave rectification circuit that is asymmetric to an antenna, and the analog front end of a reader/writer portion is operated by a differential signal and composed of a circuit symmetrical to the antenna likewise the circuits shown in FIGS. 1 and 2.

[Parent Document 1] Japanese Unexamined Patent Application Publication No. 2004-151750

A chip (LSI) having both the non-contact IC card function and the reader/writer function such as the non-contact IC card reader/writer 1 has a problem in that the chip must be more reduced in size so that it can be mounted on a terminal such as a mobile phone and the like as described above.

However, the non-contact IC card reader/writer 1 shown in FIG. 1 is disadvantageous in that the size of the chip is increased because the circuit for realizing the IC card function and the antenna and the circuit for realizing the reader/writer and the antenna are provided definitely independent of each other.

Further, the invention disclosed in Patent Document 1 is disadvantageous in that a chip is increased in size because the circuit of the non-contact IC card portion is disposed independently of the circuit of the reader/writer portion although the antenna is commonly used by the non-contact IC card portion and the reader/writer portion. Further, the invention disclosed in Patent Document 1 has a problem in that since the two circuits, which are incompatible to each other, of the analog front end of the reader/writer portion symmetrical to the antenna and the analog front end of the non-contact IC card portion asymmetric to the antenna are used by being connected to the single antenna, the receiving sensitivity of the reader/writer portion and the transmission sensitivity of the reader/writer portion are deteriorated.

An object of the present invention, which was made in view of the above circumstances, is to more reduce the size of a chip having a non-contact IC card function and a reader/writer function without deteriorating the receiving sensitivity and the signal transmission efficiency.

DISCLOSURE OF INVENTION

In a semiconductor integrated circuit of the present invention which has a non-contact IC card function and a wireless reader/writer function for non-contact IC card and to which a first antenna is connected to carry out communication with a non-contact IC card or a wireless reader/writer for non-contact IC card each placed in the vicinity of the semiconductor integrated circuit, the semiconductor integrated circuit comprises a demodulation means for demodulating a first received signal transmitted from the wireless reader/writer and received through the first antenna or a second received signal transmitted from the non-contact IC card, an full-wave rectification and smoothing means for subjecting the first received signal to full-wave rectification and smoothing, a first transmission means for transmitting a first transmission signal to the wireless reader/writer through the first antenna, and a second transmission means for transmitting a second transmission signal to the non-contact IC card through the first antenna.

The semiconductor integrated circuit may further comprises a stabilization means for stabilizing the power obtained from the first received signal subjected to the full-wave rectification and smoothing by the full-wave rectification and smoothing means.

The first transmission means may be connected behind the full-wave rectification and smoothing means as well as transmit the first transmission signal by changing the load of a second antenna of the wireless reader/writer electromagnetically coupled with the first antenna.

An end of the second transmission means may be connected to an end of the first antenna, and the other end of the second transmission means may be connected to an intermediate tap of the first antenna.

The second transmission means may transmit the second transmission signal that is a differential signal created based on a transmission carrier signal having a predetermined frequency and data to be transmitted to the non-contact IC card.

The demodulation means may demodulate the first received signal as the differential signal or the second received signal as the differential signal.

In a wireless communication apparatus of the present invention which has a non-contact IC card function and a wireless reader/writer function for non-contact IC card and carries out communication with a non-contact IC card or a wireless reader/writer for non-contact IC card each placed in the vicinity of the wireless communication apparatus, the wireless communication apparatus comprises an antenna for carrying out communication with the non-contact IC card or the wireless reader/writer, a demodulation means for demodulating a first received signal transmitted from the wireless reader/writer and received through the antenna or a second received signal transmitted from the non-contact IC card, an full-wave rectification and smoothing means for subjecting the first received signal to full-wave rectification and smoothing, a first transmission means for transmitting a first transmission signal to the wireless reader/writer through the antenna, and a second transmission means for transmitting a second transmission signal to the non-contact IC card through the antenna.

In the semiconductor integrated circuit and the wireless communication apparatus of the present invention, the first received signal transmitted from the wireless reader/writer and received through the antenna for carrying out communication with the non-contact IC card or the wireless reader/writer or the second received signal transmitted from the non-contact IC card is demodulated, the first electric signal is full-wave rectified and smoothed, the first transmission signal is transmitted to the wireless reader/writer through the antenna, and the second transmission signal is transmitted to the non-contact IC card through the antenna.

ADVANTAGES OF THE INVENTION

According to the present invention, communication can be made with an external wireless reader/writer for non-contact IC card and with an external non-contact IC card. Further, according to the present invention, the semiconductor integrated circuit and the wireless communication terminal having the non-contact IC card function and the wireless reader/writer function for non-contact IC card can be reduced in size without deteriorating a receiving sensitivity and a transmission efficiency.

REFERENCE NUMERALS

101: semiconductor integrated circuit, 111: analog front end section, 112: SPU, 113: CPU, 117: non-volatile memory, 141: voltage stabilization unit, 142: load switch, 143: carrier detection circuit, 144: power supply detection circuit, 145: power supply control circuit, 147: clock extraction circuit, 148: clock selector, 149: ASK demodulation circuit, 150: digital signal conversion unit, 151: reader/writer transmission circuit, 201: non-contact IC card reader/writer, 211: antenna, 231, 232: diode, 233: capacitor, 234: clamp circuit, 235: voltage regulator, 251: transmission data supply unit, 252: FET, 253: resistor, 271: transmission carrier supply unit, 272: transmission data supply unit, 273 to 277: inverter, 301: non-contact IC card reader/writer, 311: semiconductor integrated circuit, 312, 313: diode, 411: analog front end section, 401: non-contact IC card reader/writer, 411: antenna, 412, 413: diode, 501: non-contact IC card reader/writer, 601: mobile phone, 618: CPU

BEST MODE FOR CARRYING OUT THE INVENTION

Embodiments of the present invention will be described blow with reference to the drawings.

Figure 3:
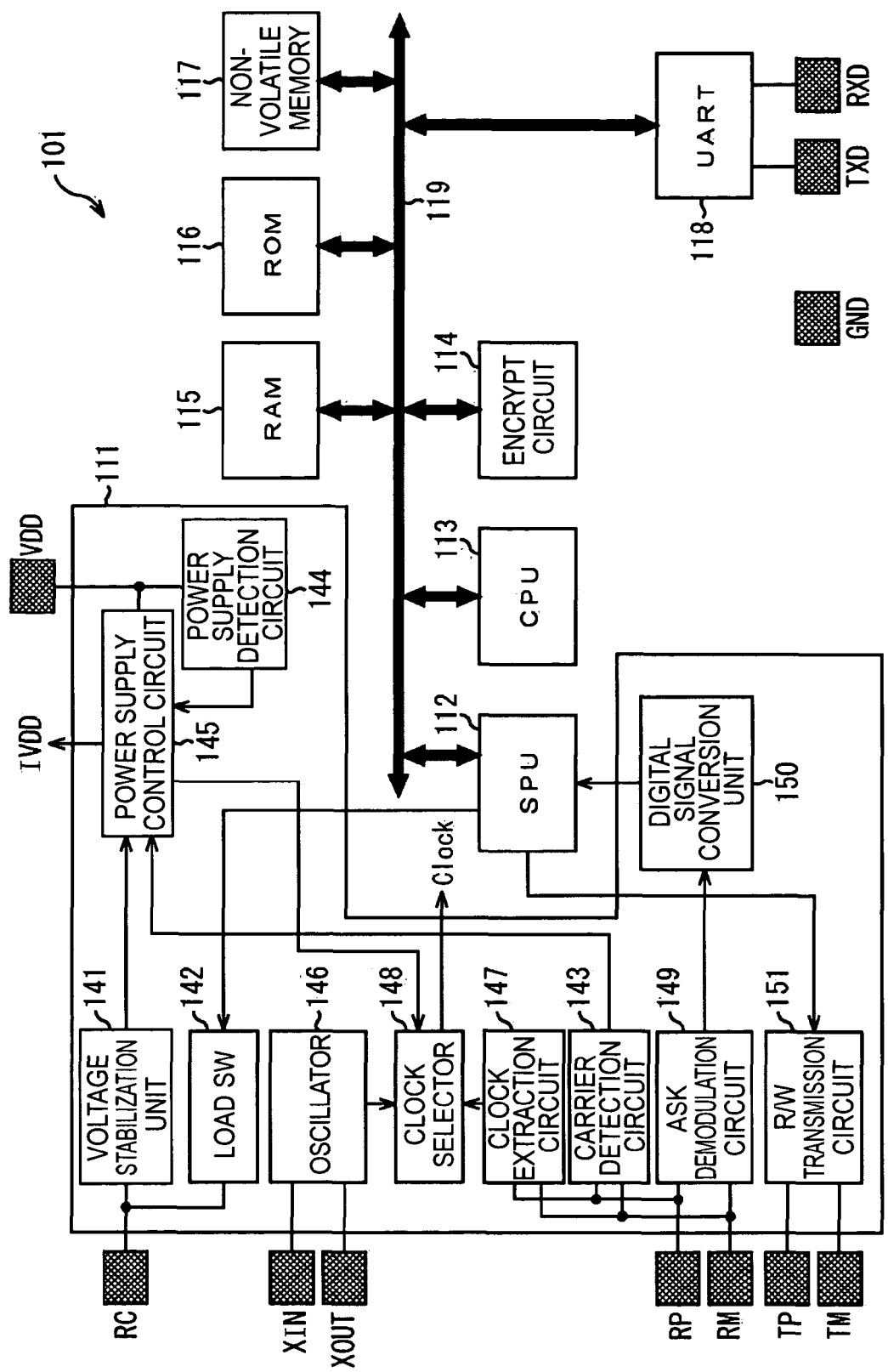
FIG. 3 is a block diagram showing an embodiment a semiconductor integrated circuit to which the present invention is applied.

FIG. 3 is a block diagram showing an example of a semiconductor integrated circuit 101 to which the present invention is applied. The semiconductor integrated circuit 101 is composed of an analog front end section 111, an SPU (Signal Processing Unit) 112, a CPU (Central Processing Unit) 113, an encrypt circuit 114, a RAM (Random Access Memory) 115, a ROM (Read Only Memory) 116, a non-volatile memory 117, and an UART (Universal Asynchronous Receiver Transmitter) 118. The analog front end section 111 is connected to the SPU 112, and the SPU 112, the CPU 113, the encrypt circuit 114, the RAM 115, the ROM 116, the non-volatile memory 117, and the UART 118 are connected to each other through a bus 119. Further, the semiconductor integrated circuit 101 is provided with external terminals RC, XIN, XOUT, RP, RM, TP, TM, VDD, TXD, and RXD as well as a ground terminal GND. The UART 118 is connected to the external terminals XTD and RXD.

The semiconductor integrated circuit 101 has a non-contact IC card function and an IC card wireless reader/writer (hereinafter, simply referred to as reader/writer) function for non-contact IC card. As will be described later with reference to FIG. 4, when an antenna is connected to the analog front end section 111 (external terminals RC, XIN, XOUT, RP, RM, TP, and TM) and the semiconductor integrated circuit 101 operates as a non-contact IC card, the semiconductor integrated circuit 101 communicates with an external wireless reader/writer (hereinafter, referred to as external reader/writer) through the antenna connected to the analog front end section 111, whereas when the semiconductor integrated circuit 101 operates as a reader/writer, it communicates with a non-contact IC card disposed externally (hereinafter, referred to as external non-contact IC card) through the antenna connected to the analog front end section 111.

Note that the signal transmitted from the external reader/writer to the semiconductor integrated circuit 101 is called an external reader/writer transmission signal, and the signal transmitted from the external non-contact IC card to the semiconductor integrated circuit 101 is called an external non-contact IC card transmission signal. Further, when the semiconductor integrated circuit 101 operates as the reader/writer, the signal transmitted from the semiconductor integrated circuit 101 to the external non-contact IC card through the antenna connected to the analog front end section 111 is called an incorporated reader/writer transmission signal, and when the semiconductor integrated circuit 101 acts as the non-contact IC card, the signal transmitted from the semiconductor integrated circuit 101 to the external reader/writer through the antenna connected to the analog front end section 111 is called an incorporated IC card transmission signal. Further, the data transmitted by the external reader/writer transmission signal is called external reader/writer transmission data, the data transmitted by the external IC card transmission signal is called external IC card transmission data, the data transmitted by the incorporated reader/writer transmission signal is called incorporated reader/writer transmission data, and the data transmitted by the incorporated IC card transmission signal is called incorporated IC card transmission data.

The analog front end section 111 is composed of a voltage stabilization unit 141, a load switch (SW) 142, a carrier detection circuit 143, a power supply detection circuit 144, a power supply control circuit 145, an oscillator 146, a clock extraction circuit 147, a clock selector 148, an ASK demodulation circuit 149, a digital signal conversion unit 150, and a reader/writer (R/W) transmission circuit 151. The voltage stabilization unit 141 and the load switch (SW) 142 are connected to the external terminals RC, the oscillator 146 is connected to the external terminals XIN and XOUT, the carrier detection circuit 143, the clock extraction circuit 147, and the ASK demodulation circuit 149 are connected to the external terminals RP and RM, the reader/writer transmission circuit 151 is connected to the external terminals TP and TM, and the power supply detection circuit 144 and the power supply control circuit 145 are connected to the external terminal VDD.

The voltage stabilization unit 141 is composed of, for example, a clamp circuit and a voltage regulator, stabilizes the power obtained from the external reader/writer transmission signal received from the external reader/writer through the external terminal RC to a predetermined direct voltage as described below with reference to FIG. 4 and supplies the power (hereinafter, referred to as external reader/writer power) to the power supply control circuit 145.

As will be described below with reference to FIG. 5, when the semiconductor integrated circuit 101 operates as the non-contact IC card, it transmits the incorporated IC card transmission signal to the external reader/writer by changing the load of the antenna of the external reader/writer electromagnetically coupled with the antenna connected to the analog front end section 111 by turning on or off a switch disposed in the load switch 142 based on the incorporated IC card transmission data supplied from the SPU 112.

The carrier detection circuit 143 detects whether or not the external reader/writer is caused to approach the antenna connected to the analog front end section 111 and the electromagnetic wave (carrier wave) radiated from the external reader/writer is received by the antenna connected to the analog front end section 111 by receiving the external reader/writer transmission signal through the external terminals RP and RM. When the carrier detection circuit 143 detects that the external reader/writer transmission signal is received, it supplies a signal (hereinafter, referred to as external reader/writer transmission signal detection signal) showing the result of detection to the power supply control circuit 145.

The power supply detection circuit 144 detects whether or not power (hereinafter, referred to as external power supply power) is supplied from an external power supply connected to the external terminal VDD, and when the power supply detection circuit 144 detects that the power is supplied from the external power supply, it supplies a signal (hereinafter, referred to as external power supply detection signal) showing the result of detection to the power supply control circuit 145.

The power supply control circuit 145 selects one of the external reader/writer power supplied from the voltage stabilization unit 141 and the external power supply power supplied from the external power supply and supplies the selected power to the respective units of the semiconductor integrated circuit 101. When, for example, the external power supply detection signal is supplied from the power supply detection circuit 144, the power supply control circuit 145 supplies the external power supply power to the respective units of the semiconductor integrated circuit 101, whereas when no external power supply detection signal is supplied from the power supply detection circuit 144, the power supply control circuit 145 supplies the external reader/writer power to the respective units of the semiconductor integrated circuit 101.

When, for example, the semiconductor integrated circuit 101 is disposed to a mobile phone, a sufficient amount of power may not be obtained from the external reader/writer transmission signal because the size of the antenna connected to the semiconductor integrated circuit 101 is restricted or the electromagnetic wave supplied from the external reader/writer is shut off by a substrate and the like of the mobile phone. In this case, the semiconductor integrated circuit 101 can be securely operated by connecting a battery of the mobile phone to the external terminal VDD as an external power supply and supplying the power thereof to the respective units of the semiconductor integrated circuit 101. Further, even if the battery of the mobile phone is exhausted or even if no power is supplied from the external terminal VDD, the semiconductor integrated circuit 101 can be continuously operated by switching the power of the external reader/writer so that it is supplied to the respective units of the semiconductor integrated circuit 101.

Further, the power supply control circuit 145 controls the power to be supplied such that it is supplied to the respective units of the semiconductor integrated circuit 101 only when the external reader/writer transmission signal detection signal is received or only when the semiconductor integrated circuit 101 operates as the reader/writer. With this arrangement, since the power is supplied to the respective units of the semiconductor integrated circuit 101 only when the semiconductor integrated circuit 101 operates, the consumption of power of the external power supply connected to the external terminal VDD circuit can be saved.

Further, the power supply control circuit 145 supplies a signal (hereinafter, referred to as external reader/writer power supply signal) showing that the external reader/writer power is supplied from the voltage stabilization unit 141 to the clock selector 148.

The oscillator 146 constitutes a clock circuit together with an oscillator such as a crystal oscillator, a ceramic oscillator, and the like connected to the external terminals XIN and XOUT, creates a clock signal (hereinafter, referred to as external oscillation clock signal) having a predetermined frequency (for example, 13.56 MHz), and supplies the created external oscillation clock signal to the clock selector 148.

The clock extraction circuit 147 extracts the clock component of the external reader/writer transmission signal received from the external reader/writer through the external terminals RP and RM and supplies the extracted clock component to the clock selector 148 as a clock signal (hereinafter, referred to as external reader/writer clock signal).

The clock selector 148 select one of the external oscillation clock signal supplied from the oscillator 146 and the external reader/writer clock signal supplied from the clock extraction circuit 147 based on the external reader/writer power supply signal supplied from the power supply control circuit 145 and supplies the selected clock signal to the respective units of the semiconductor integrated circuit 101. When, for example, the external reader/writer power supply signal is supplied, that is, when the external reader/writer power is obtained from the external reader/writer transmission signal, the clock selector 148 supplies the external reader/writer clock signal to the respective units of the semiconductor integrated circuit 101, whereas when no external reader/writer power supply signal is supplied, that is, when the semiconductor integrated circuit 101 operates as the reader/writer or when no external reader/writer power is obtained from the external reader/writer transmission signal, the clock selector 148 supplies the external oscillation clock signal to the respective units of the semiconductor integrated circuit 101.

The ASK demodulation circuit 149 receives the external reader/writer transmission signal transmitted from the external reader/writer or the external IC card transmission signal transmitted from the external non-contact IC card through the external terminals RP and RM. The ASK demodulation circuit 149 demodulates the external reader/writer transmission signal or the external IC card transmission signal that is ASK modulated and supplies the demodulated signal to the digital signal conversion unit 150. That is, in the semiconductor integrated circuit 101, a circuit for demodulating the external reader/writer transmission signal is commonly used as a circuit for demodulating the external IC card signal.

Note that the carrier detection circuit 143, the clock extraction circuit 147, and the ASK demodulation circuit 149 are operated by a differential voltage of the signal input to the external terminals RP and RM, that is, by the external reader/writer transmission signal input as a differential signal or to the external IC card transmission signal input as a differential signal. Accordingly, the not shown input units of the carrier detection circuit 143, the clock extraction circuit 147, and the ASK demodulation circuit 149 constitute symmetrical circuits with reference to the external terminals RP and RM.

The digital signal conversion unit 150 amplifies the external reader/writer transmission signal or the IC card transmission signal supplied from the ASK demodulation circuit 149 and subjects the amplified signal to A/D (Analog/Digital) conversion. The digital signal conversion unit 150 supplies the external reader/writer transmission signal or the external IC card transmission signal subjected to the A/D conversion to the SPU 112.

The reader/writer transmission circuit 151 creates a transmission carrier signal having a predetermined frequency (for example, 13.56 MHz) based on the clock signal supplied from the clock selector 148. As will be described referring to FIG. 6, the reader/writer transmission circuit 151 modulates the transmission carrier signal based on the incorporated reader/writer transmission data supplied from the SPU 112 and transmits the modulated signal (incorporated reader/writer transmission signal) to the external non-contact IC card through the antenna connected to the analog front end section 111.

The SPU 112 subjects the external reader/writer reproduction signal or the external IC card transmission signal obtained from the analog front end section 111 to a predetermined processing (for example, conversion of a Manchester-coded signal to a signal of an NRZ (Non Return Zero) system, confirmation of matching of packets included in the received signals, and the like) and supplies the processed signals to the CPU 113. Further, the SPU 112 obtains the incorporated IC card transmission data to be transmitted to the external reader/writer or the incorporated reader/writer transmission signal to be transmitted to the external non-contact IC card from the CPU 113 and subjects the obtained data to a predetermined processing (for example, making the transmission data to packets, Manchester coding of the NRZ system transmission data, and the like). The SPU 112 supplies the incorporated IC card transmission data subjected to the predetermined processing to the load switch 142 and supplies the incorporated reader/writer transmission data subjected to the predetermined processing to the reader/writer transmission circuit 151.

The CPU 113 controls the processing of the respective units of the semiconductor integrated circuit 101. Further, when the external reader/writer indicates the CPU 113 to write data at the time the semiconductor integrated circuit 101 operates as the non-contact IC card, the CPU 113 stores the indicated data to the non-volatile memory 117 based on the external reader/writer transmission signal. Further, when the external reader/writer indicates the CPU 113 to read data at the time the semiconductor integrated circuit 101 operates as the non-contact IC card, the CPU 113 reads the indicated data from the non-volatile memory 117 based on the external reader/writer transmission signal, creates incorporated IC card transmission data for transmitting the read data, and supplies the created incorporated IC card transmission data to the SPU 112.

When data is read from the external non-contact IC card at the time the semiconductor integrated circuit 101 operates as the reader/writer, the CPU 113 creates incorporated reader/writer transmission data for indicating the read and supplies the created incorporated reader/writer transmission data to the SPU 112. Further, when data is written to the external non-contact IC card at the time the semiconductor integrated circuit 101 operates as the reader/writer, the CPU 113 creates incorporated reader/writer transmission data for indicating the write and supplies the created incorporated reader/writer transmission data to the SPU 112.

The CPU 113 supplies the external reader/writer transmission signal or the external IC card transmission signal obtained from the analog front end section 111 to the encrypt circuit 114 as necessary and decrypts the encrypted signal. Further, the CPU 113 supplies the incorporated IC card transmission data to be transmitted to the external reader/writer or the incorporated reader/writer transmission data to be transmitted to the external non-contact IC card to the encrypt circuit 114 as necessary and encrypts the supplied data.

The CPU 113 stores the external reader/writer transmission data obtained from the external reader/writer transmission signal or the external IC card transmission data obtained from the external IC card transmission signal to the RAM 115 or the non-volatile memory 117 or transmits the transmission data to an external information processing apparatus, which is connected to the terminals TXD and RXD, through the UART 118 as necessary. Further, the CPU 113 obtains the data, the control signal, and the like input from the external information processing apparatus, which is connected to the terminals TXD and RXD, through the UART 118.

The encrypt circuit 114 encrypts data and decrypts the encrypted data under the control of the CPU 113.

The RAM 115 stores a program used to carry out the processing of the SPU 112 or the CPU 113 and parameters and data that are appropriately changed in the execution of the processing.

The ROM 116 stores basically fixed data of the program and the arithmetic operation parameters used by the CPU 113.

The non-volatile memory 117 is composed of a rewritable non-volatile memory such as an EEPROM (Electrically Erasable and Programmable Read Only Memory), MRAM (Magnetoresistive Random Access Memory), FeRAM (Ferroelectric Random Access Memory), OUM (Ovonic Unified Memory), and the like. The non-volatile memory 117 stores, for example, various types of data that is indicated to be written thereto by the external reader/writer and continuously stores the data even after the power supplied to the non-volatile memory 117 is interrupted.

The UART 118 is connected to the external information processing apparatus through the external terminals TXD and RXD and controls the communication therewith.

Figure 4:
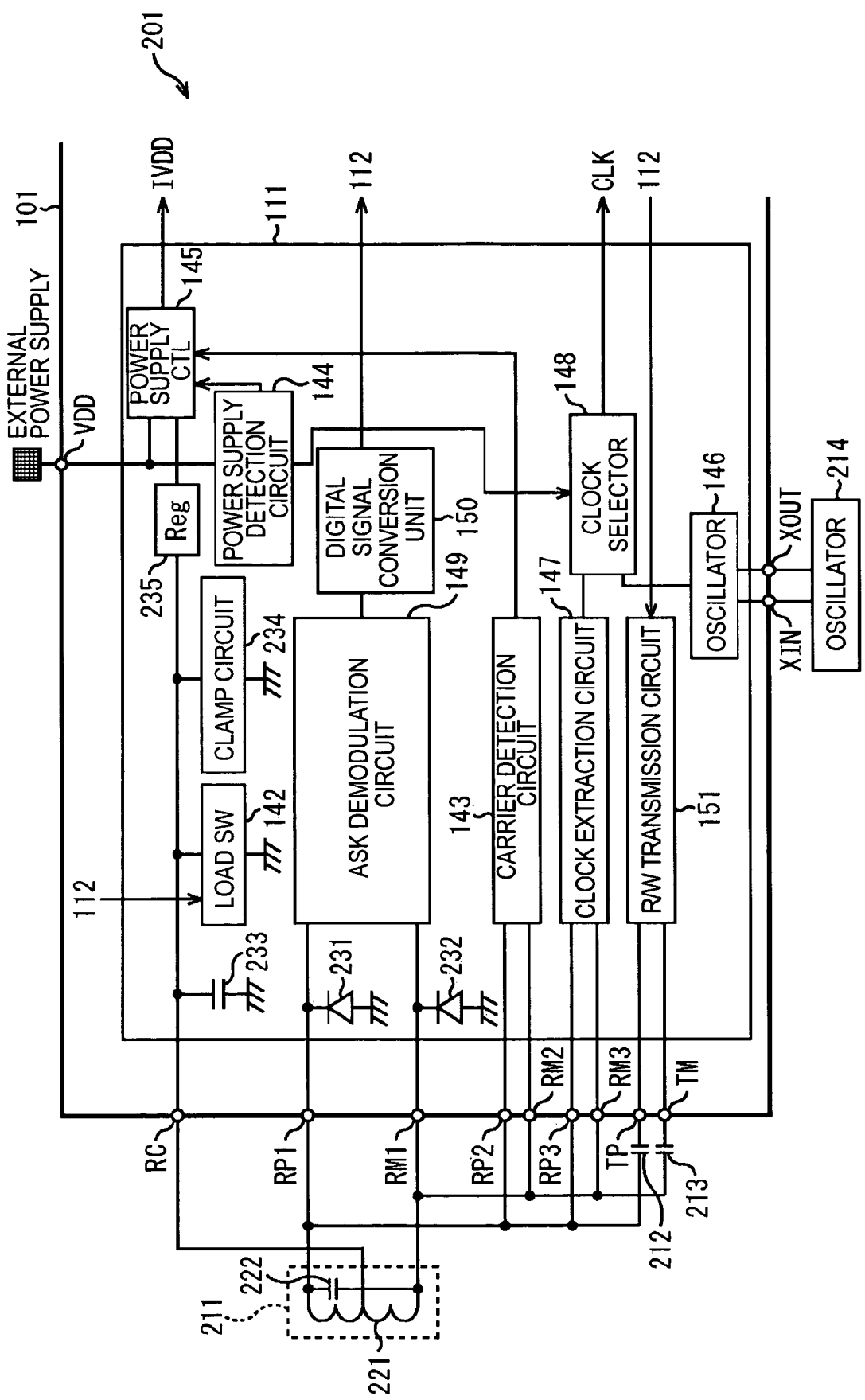
FIG. 4 is a view showing an embodiment of a non-contact IC card reader/writer to which the present invention is applied.

FIG. 4 is a view showing an embodiment of a non-contact IC card reader/writer 201 using the semiconductor integrated circuit 101 of FIG. 3. The non-contact IC card reader/writer 201 is composed of the semiconductor integrated circuit 101, an antenna 211, capacitors 212 and 213, and an oscillator 214 and arranged as, for example, one module. Note that FIG. 4 shows only the analog front end section 111 of the semiconductor integrated circuit 101 and the other portions thereof are omitted. Further, the analog front end section 111 is shown in more detail in FIG. 4 than in FIG. 3. Further, the portions in FIG. 4 that correspond to those in FIG. 3 are denoted by the same reference numerals and the repeated description thereof is appropriately omitted.

As compared with FIG. 3, FIG. 4 additionally shows diodes 231 and 232 and a capacitor 233 in the analog front end section 111, and shows the voltage stabilization unit of FIG. 3 by separating it to a clamp circuit 234 and a voltage regulator (Reg) 235. Further, as compared with FIG. 3, FIG. 4 separately shows the external terminals RP and RM of FIG. 3 as each three external terminals, that is, external terminals RP1 to RP3 and external terminals RM1 to RM3 as well as makes such a modification that the external terminals RP1 to RP3 are connected externally of the semiconductor integrated circuit 101 and the external terminals RM1 to RM3 are connected externally of the semiconductor integrated circuit 101.

The antenna 211 has a resonant circuit composed of a loop coil 221 and a capacitor 222. An end of the antenna 211 is connected to external terminals RP1 to RP3 of the semiconductor integrated circuit 101 and to an end of the capacitor 212. The other end of the antenna 211 is connected to external terminals RM1 to RM3 of the semiconductor integrated circuit 101 and to an end of the capacitor 213. Further, an intermediate tap is extracted from a center of the loop coil 221 of the antenna 211 and connected to an external terminal RC of the semiconductor integrated circuit 101. As described later, communication with an external reader/writer and communication with an external non-contact IC card are carried out through the common antenna 211.

An end of the capacitor 212, which is different from the end thereof connected to the one end of the antenna 211, is connected to an external terminal TP. An end of the capacitor 213, which is different from the end thereof connected to the one end of the antenna 211, is connected to an external terminal TM. Note that the capacitors 212 and 213 may be disposed internally of the semiconductor integrated circuit 101.

The oscillator 214, which is composed of, for example, a crystal oscillator, ceramic oscillator, and the like, is connected to external terminals XIN and XOUT of the semiconductor integrated circuit 101. An external power supply, for example, a battery and the like is connected to an external terminal VDD.

A cathode of the diode 231 of the analog front end section 111 is connected to the external terminal RP1, and an anode thereof is grounded. A cathode of the diode 232 is connected to the external terminal RM1, and an anode thereof is grounded. An end of the capacitor 233 is connected to the external terminal RC, and the other end thereof is grounded. A center-tap full-wave rectification/smoothing circuit, which is a symmetrical circuit with respect to the antenna 211, is composed of the diodes 231 and 232 and the capacitor 233.

An end of the clamp circuit 234 is connected to the external terminal RC, and the other end thereof is grounded. An end of the voltage regulator 235 is connected to the external terminal RC, and the other end thereof is connected to a power supply control circuit 145. An ASK demodulation circuit 149 is connected to the external terminals RP1 and RM1, a carrier detection circuit 143 is connected to the external terminals RP2 and RM2, and a clock extraction circuit 147 is connected to the external terminals RP3 and RM3.

Next, the processing of the analog front end section 111 of the non-contact IC card reader/writer 201 will be explained.

First, the processing of the analog front end section when the non-contact IC card reader/writer 201 operates as the non-contact IC card and receives the external reader/writer transmission signal from the external reader/writer will be explained.

When the external reader/writer is caused to approach the antenna 211, an electromagnetic wave is radiated from the external reader/writer to the antenna 211. The antenna 211 converts the received electromagnetic wave into an electric signal (external reader/writer transmission signal). The external reader/writer transmission signal is a signal obtained by ASK modulating a carrier wave having a predetermined frequency (for example, 13.56 MHz), and external reader/writer transmission data for indicating to write and read data is transmitted by the signal.

The external reader/writer transmission signal input from the external terminal RC is full-wave rectified and smoothed by the full-wave rectification/smoothing circuit composed of the diodes 231 and 232 and the capacitor 233. The clamp circuit 234 and the voltage regulator 235 stabilize the power (external reader/writer power) obtained from the full-wave rectified and smoothed external reader/writer transmission signal to a predetermined direct current and supplies it to the power supply control circuit 145 as a power source.

Further, since an anode of the diode 231 whose cathode is connected to the external terminals PR1 to PR3 and an anode of the diode 232 whose cathode is connected to the external terminals RM1 to RM3 are grounded together, the external reader/writer transmission signal is supplied from the antenna 211 to the carrier detection circuit 143 through the terminals RP2 and RM2, is supplied from the antenna 211 to the clock extraction circuit 147 through the terminals RP3 and RM3, and is supplied to the ASK demodulation circuit through the terminals RP1 and RM1.

On receiving the external reader/writer transmission signal, the carrier detection circuit 143 supplies a external reader/writer transmission signal detection signal to the power supply control circuit 145. When the power supply detection circuit 144 is supplied with the external power supply power from the external power supply connected to an external terminal VDD, it supplies an external power supply detection signal to the power supply control circuit 145. When the power supply control circuit 145 is supplied with the external power supply detection signal from the power supply detection circuit 144, it supplies the external power supply power to the respective units of the semiconductor integrated circuit 101, whereas when the power supply control circuit 145 is supplied with no external power supply detection signal from the power supply detection circuit 144, it supplies the external reader/writer power to the respective units of the semiconductor integrated circuit 101.

Figure 2:
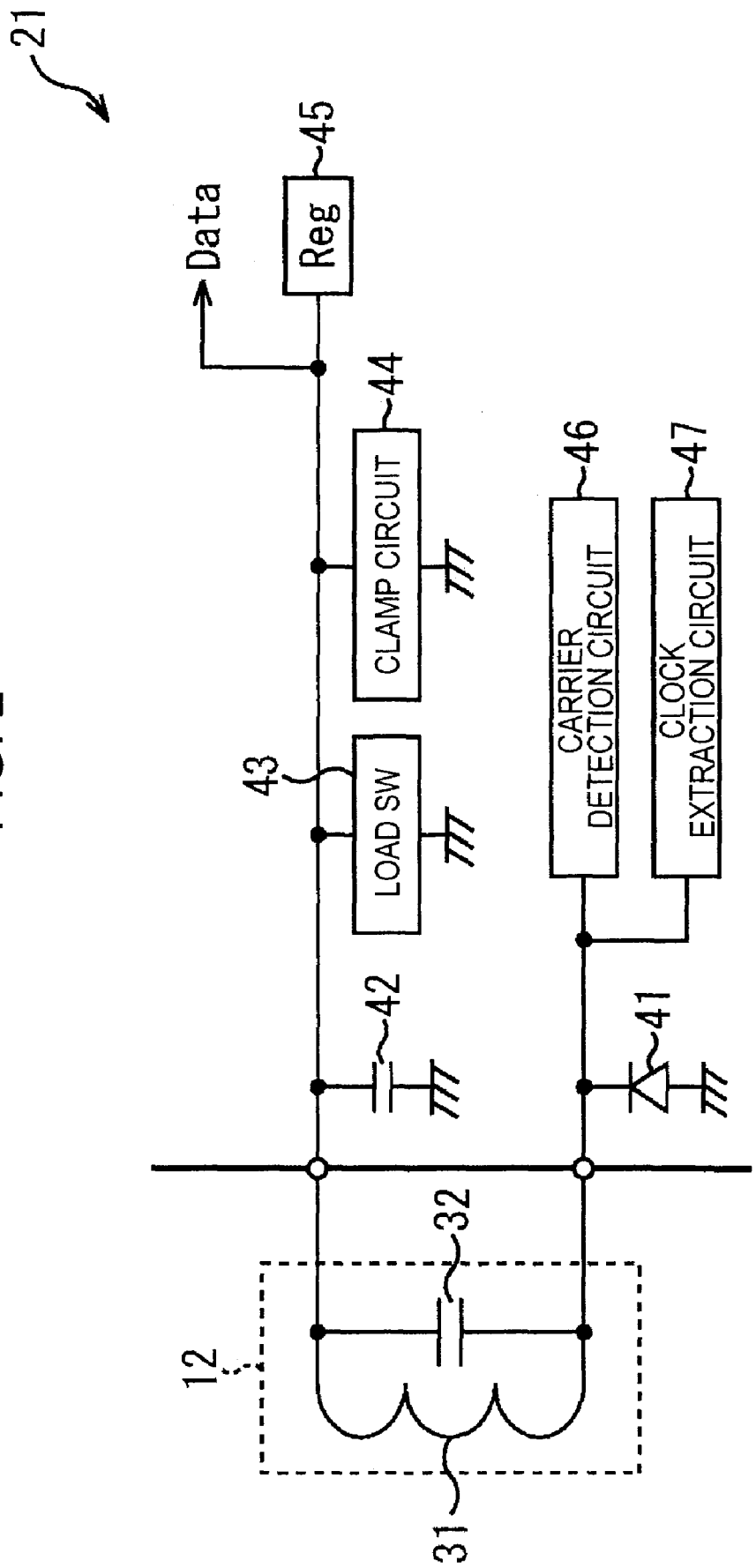
FIG. 2 is a block diagram showing a constitutional example of the analog front end of the conventional non-contact IC card circuit of FIG. 1.

As described above, in the semiconductor integrated circuit 101, since the power supplied to the respective units of the semiconductor integrated circuit 101 is obtained from the full-wave rectified and smoothed external reader/writer transmission signal, a rectification efficiency is more improved than the power obtained from the half-wave rectified and smoothed external reader/writer transmission signal as in the non-contact IC card circuit 21 of FIG. 2, thereby a larger amount of power can be obtained from the external reader/writer transmission signal.

Further, the power supply control circuit 145 supplies an external reader/writer power supply signal to a clock selector 148.

The oscillator 146 supplies an external oscillation clock signal having a predetermined frequency (for example, 13.56 MHz) to the clock selector 148. The clock extraction circuit 147 extracts a clock component from the external reader/writer transmission signal and supplies the extracted clock component to the clock selector 148 as an external reader/writer clock signal. In this case, since the external reader/writer power supply signal is supplied, the clock selector 148 supplies the external reader/writer clock signal supplied from the clock extraction circuit 147 to the respective units of the semiconductor integrated circuit 101.

The ASK demodulation circuit 149 demodulates the ASK modulated external reader/writer transmission signal and supplies the demodulated external reader/writer transmission signal to a digital signal conversion unit 150. The digital signal conversion unit 150 amplifies the external reader/writer transmission signal, subjects the amplified signal to A/D conversion, and supplies the A/D converted digital signal to a SPU 112.

Since the ASK demodulation circuit 149 processes the external reader/writer transmission signal by a differential signal, the receiving sensitivity of the external reader/writer transmission signal is more improved than the case in which the external reader/writer transmission signal is processed after it is half-wave rectified and smoothed as in the non-contact IC card circuit 21 of FIG. 2. Further, since the carrier detection circuit 143 and the clock extraction circuit 147 also process the external reader/writer transmission signal by a differential signal, the detection accuracy of the external reader/writer transmission signal or the clock component extraction accuracy of the external reader/writer transmission signal is more improved than the case in which the external reader/writer transmission signal is processed by the single end signal as in the non-contact IC card circuit 21 of FIG. 2.

Next, the processing of the analog front end section 111 when the non-contact IC card reader/writer 201 operates as the non-contact IC card and transmits the incorporated IC card transmission signal to the external reader/writer will be explained.

Figure 5:
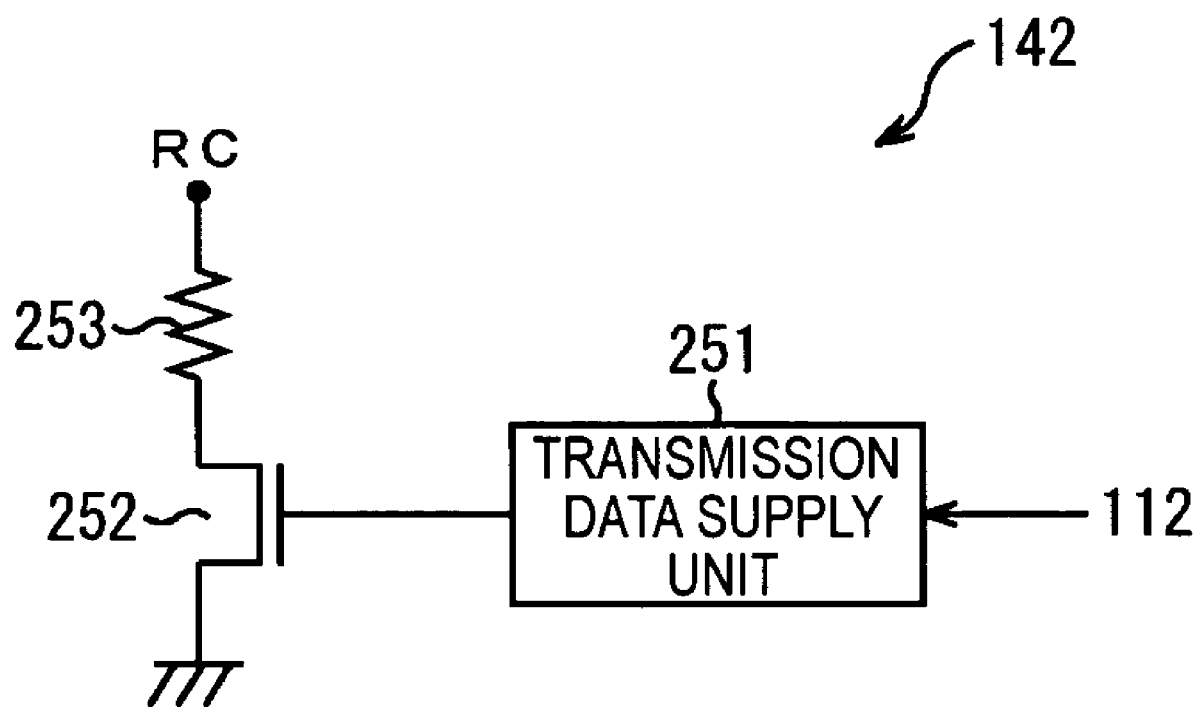
FIG. 5 is a view showing a load switch of FIG. 4 in detail.

FIG. 5 is a view showing a load switch 142 connected behind the full-wave rectification and smoothing circuit composed of the diodes 231 and 232 and the capacitor 233.

The load switch 142 is composed of a transmission data supply unit 251, an FET (Field Effect Transistor) 252 and a resistor 253. An end of the resistor 253 is connected to the external terminal RC, and the other end of the resistor 253 is connected to a drain of the FET 252. A source of the FET 252 is grounded, and a gate thereof is connected to the transmission data supply unit 251.

The SPU 112 supplies the incorporated IC card transmission data to be supplied to the external reader/writer to the transmission data supply unit 251 under the control of the CPU 113. Note that the incorporated IC card transmission data is set to any of a high value and a low value. When the FET 252 is turned on or off based on the value of the incorporated IC card data, the resistor 253 is switched to a state that the resistor 253 is disposed in parallel to the antenna 211 and a state that it is not disposed in parallel to the antenna 211 according to the value of the incorporated IC card transmission data. With this operation, the impedance (the load of an antenna disposed to the external reader/writer) of a circuit electromagnetically coupled through the antenna 211 is changed, thereby the incorporated IC card transmission signal based on the incorporated IC card transmission data is transmitted from the non-contact IC card reader/writer 201 to the external reader/writer.

Next, the processing of the analog front end section 111 when the non-contact IC card reader/writer 201 operates as the reader/writer and transmits the incorporated reader/writer transmission signal to the external non-contact IC card will be explained.

Figure 6:
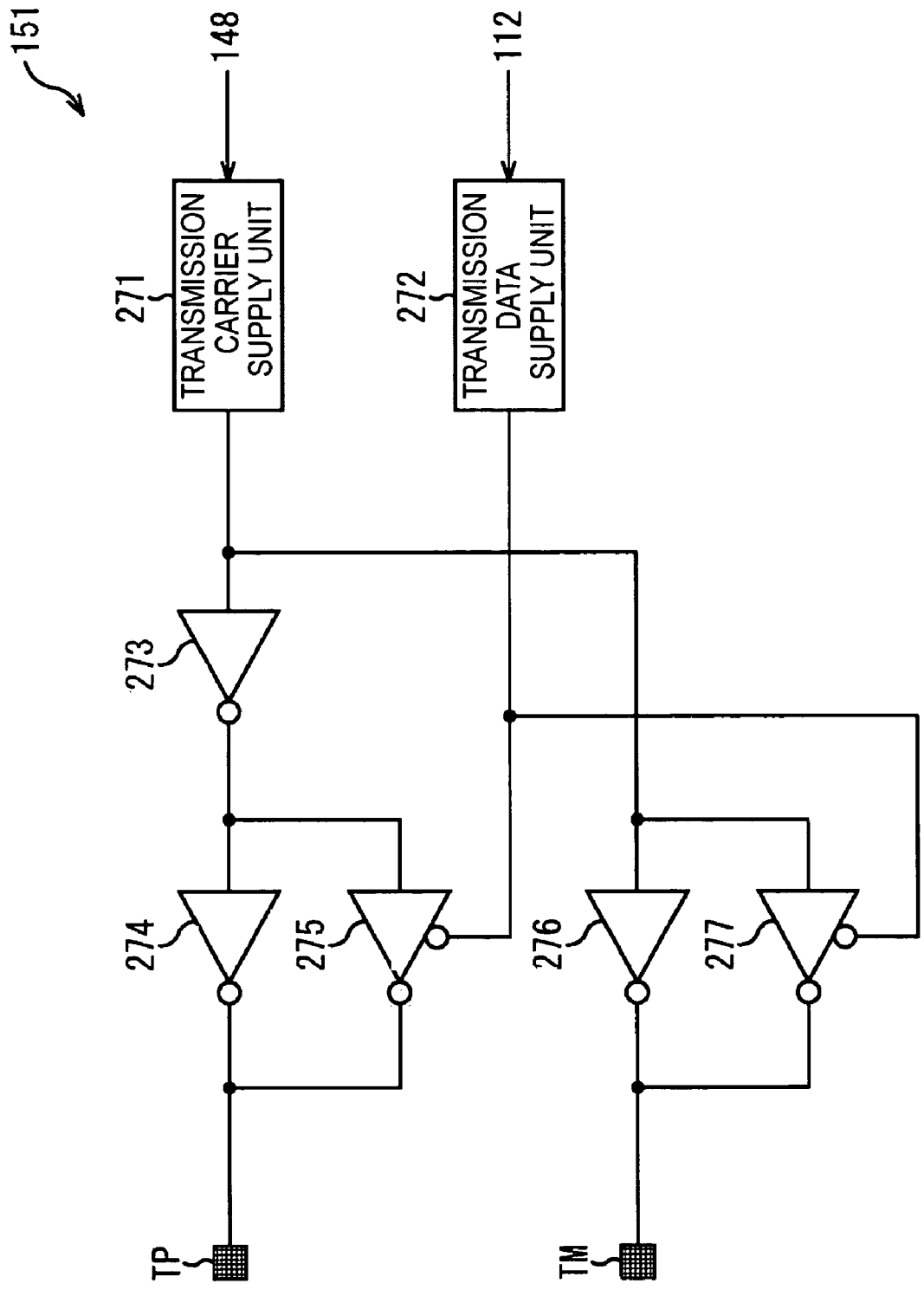
FIG. 6 is a view showing a reader/writer transmitter circuit of FIG. 4 in detail.

FIG. 6 is a view showing the reader/writer transmission circuit 151 in detail.

The reader/writer transmission circuit 151 is composed of a transmission carrier supply unit 271, a transmission data supply unit 272, and inverters 273 to 277.

The transmission carrier supply unit 271 creates a transmission carrier signal having a predetermined frequency (for example, 13.56 MHz) based on the clock signal supplied from the clock selector 148 and supplies the created transmission carrier signal to the inverters 273, 276, and 277.

The SPU 112 supplies the incorporated reader/writer transmission data to be supplied to the external non-contact IC card to the transmission data supply unit 272 under the control of the CPU 113. The transmission data supply unit 272 supplies the incorporated reader/writer transmission data to the inverters 275 and 277. Note that the value of the incorporated reader/writer transmission data is set to any of a high value and a low value.

The inverter 273 supplies an inverted-phase signal obtained by inverting the polarity of the transmission carrier signal (hereinafter, referred to as inverted-phase carrier signal) to the inverters 274 and 275. The inverter 274 outputs a signal obtained by inverting the polarity of the inverted-phase carrier signal, that is, the original transmission carrier signal. When the incorporated reader/writer transmission data is set to the high value, the inverter 275 interrupts the output of the signal, whereas when the incorporated reader/writer transmission data is set to the low value, the inverter 275 outputs a signal obtained by inverting the polarity of the inverted-phase carrier signal, that is, the original transmission carrier signal. The signals output from the inverters 274 and 275 are superimposed with each other (ASK modulated), and the superimposed signal is output to the capacitor 212 through the terminal TP. More specifically, an ASK modulated transmission carrier signal is output from the terminal TP by driving only the inverter 274 when the incorporated reader/writer transmission signal is set to the high value and by driving both the inverters 274 and 275 when the incorporated reader/writer transmission signal is set to the low value.

The inverter 276 outputs a personal information carrier signal obtained by inverting the polarity of the transmission carrier signal. When the incorporated reader/writer transmission data is set to the high value, the inverter 277 interrupts the output of the signal, whereas when the incorporated reader/writer transmission data is set to the low value, the inverter 277 outputs an inverted-phase carrier signal. The signals output from the inverters 276 and 277 are superimposed with each other (ASK modulated) and output to the capacitor 213 through the terminal TM. More specifically, an ASK modulated personal information transmission carrier signal is output from the terminal TM by driving only the inverter 276 when the incorporated reader/writer transmission signal is set to the high value and by driving both the inverters 276 and 277 when the incorporated reader/writer transmission signal is set to the low value.

The signal output from the terminal TP is supplied to the antenna 211 after the direct current component thereof is removed by the capacitor 212, and the signal output from the terminal TM is supplied to the antenna 211 after the direct current component thereof is removed by the capacitor 213. An electromagnetic wave corresponding to the signals passed through the capacitors 212 and 213 is radiated from the antenna 211, and the external non-contact IC card receives the electromagnetic wave. More specifically, the antenna 211 is driven by the incorporated reader/writer transmission signal as the differential signal output from the reader/writer transmission circuit 151.

Next, the processing of the analog front end section when the non-contact IC card reader/writer 201 operates as the reader/writer and receives the external IC card transmission signal from the external non-contact IC card will be explained.

The external non-contact IC card transmits the external IC card transmission signal to the non-contact IC card reader/writer 201 after the signal is ASK modulated by changing the load of the antenna 211 electromagnetically coupled with the antenna of the external non-contact IC card by the same processing as the case in which the non-contact IC card reader/writer 201 described above transmits the incorporated IC card transmission signal to the external reader/writer.

The external IC card transmission signal is supplied to the ASK demodulation circuit 149 through the terminals RP1 and RM1 as a differential signal likewise the external reader/writer transmission signal. The ASK demodulation circuit 149 demodulates the ASK modulated external IC card transmission signal and supplies the demodulated external IC card transmission signal to the digital signal conversion unit 150. The digital signal conversion unit 150 amplifies the external IC card transmission signal, further subjects the amplified signal to A/D conversion, and supplies the A/D converted digital signal to the SPU 112.

Figure 1:
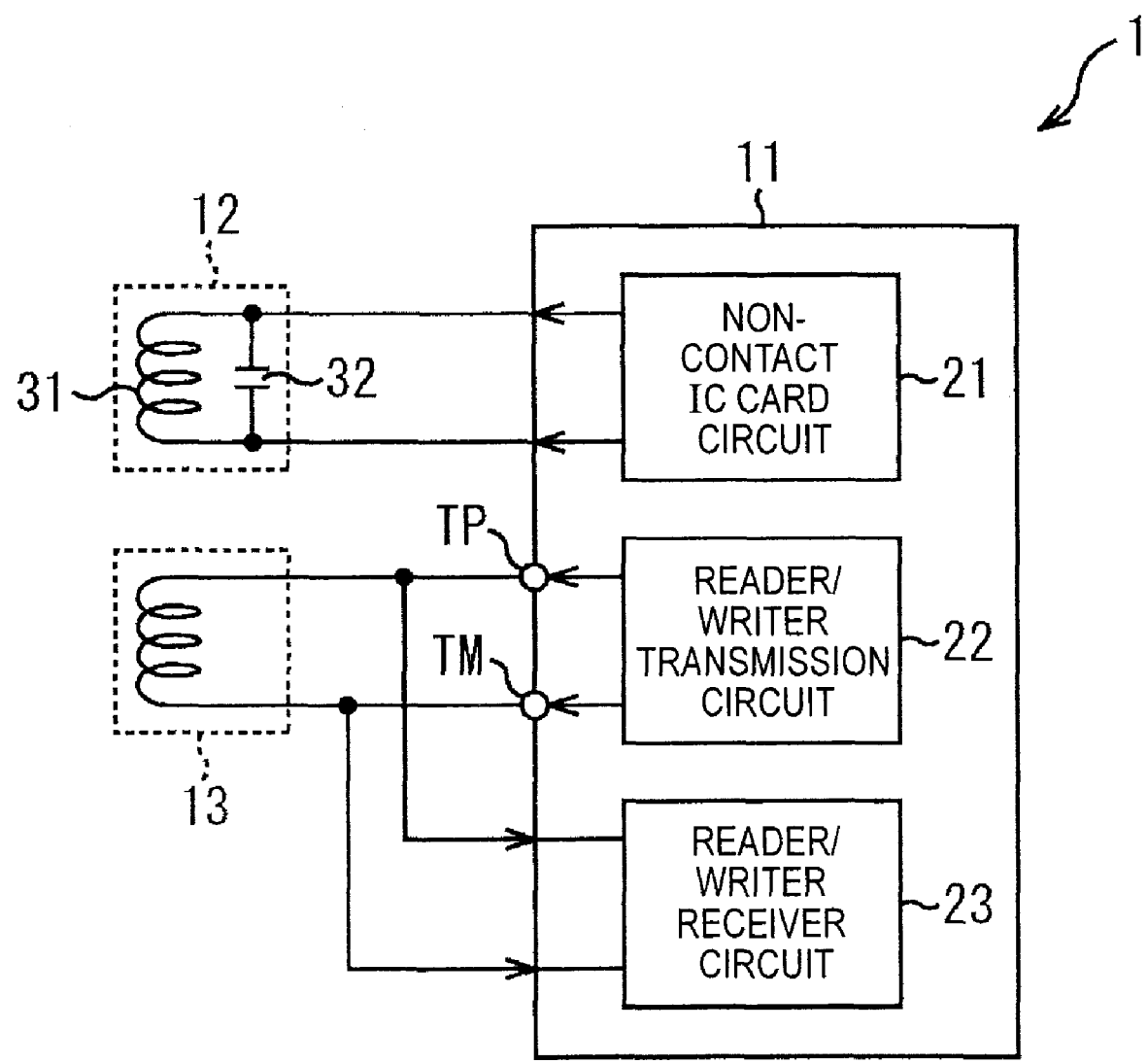
FIG. 1 is a block diagram showing a constitutional example of a conventional non-contact IC card reader/writer.

Note that since the ASK demodulation circuit 149 receives the external IC card transmission signal as the differential signal likewise the reader/writer receiver circuit 23 of the non-contact IC card reader/writer 1 of FIG. 1, the receiving sensitivity to the external IC card transmission signal of the non-contact IC card reader/writer 201 is almost the same as that of the non-contact IC card reader/writer 1 of FIG. 1.

As described above, the antenna for non-contact IC card and the antenna for reader/writer are arranged as a single common antenna, and the ASK demodulation circuit for non-contact IC card and the ASK demodulation circuit for reader/writer are arranged as a single common circuit, thereby the chip of the non-contact IC card having the non-contact IC card function and the reader/writer function can be more reduced in size. Further, since the external reader/writer transmission signal is processed by the differential signal, the receiving sensitivity to the external reader/writer transmission signal (non-contact IC card function) can be improved. Further, since the external reader/writer power is obtained from the external reader/writer transmission signal subjected to the full-wave rectification and smoothing, a power conversion efficiency can be improved.

Further, as described above, the front end (the full-wave rectification and smoothing circuit composed of the diodes 231 and 232 and the capacitor 233 as well as the carrier detection circuit 143 for receiving the differential signal, the clock extraction circuit 147, and the input unit of the ASK demodulation circuit 149) to the antenna 211 of the circuit for realizing the non-contact IC card function is arranged symmetrical to the antenna 211. As a result, since the front end has good compatibility to the front end (the input unit of the ASK demodulation circuit 149 and the reader/writer transmission circuit 151) of the circuit for realizing the reader/writer function which is arranged symmetrical to the antenna 211 likewise, even if the single common antenna is used, the transmission efficiency of the reader/writer function is not deteriorated.

Figure 7:
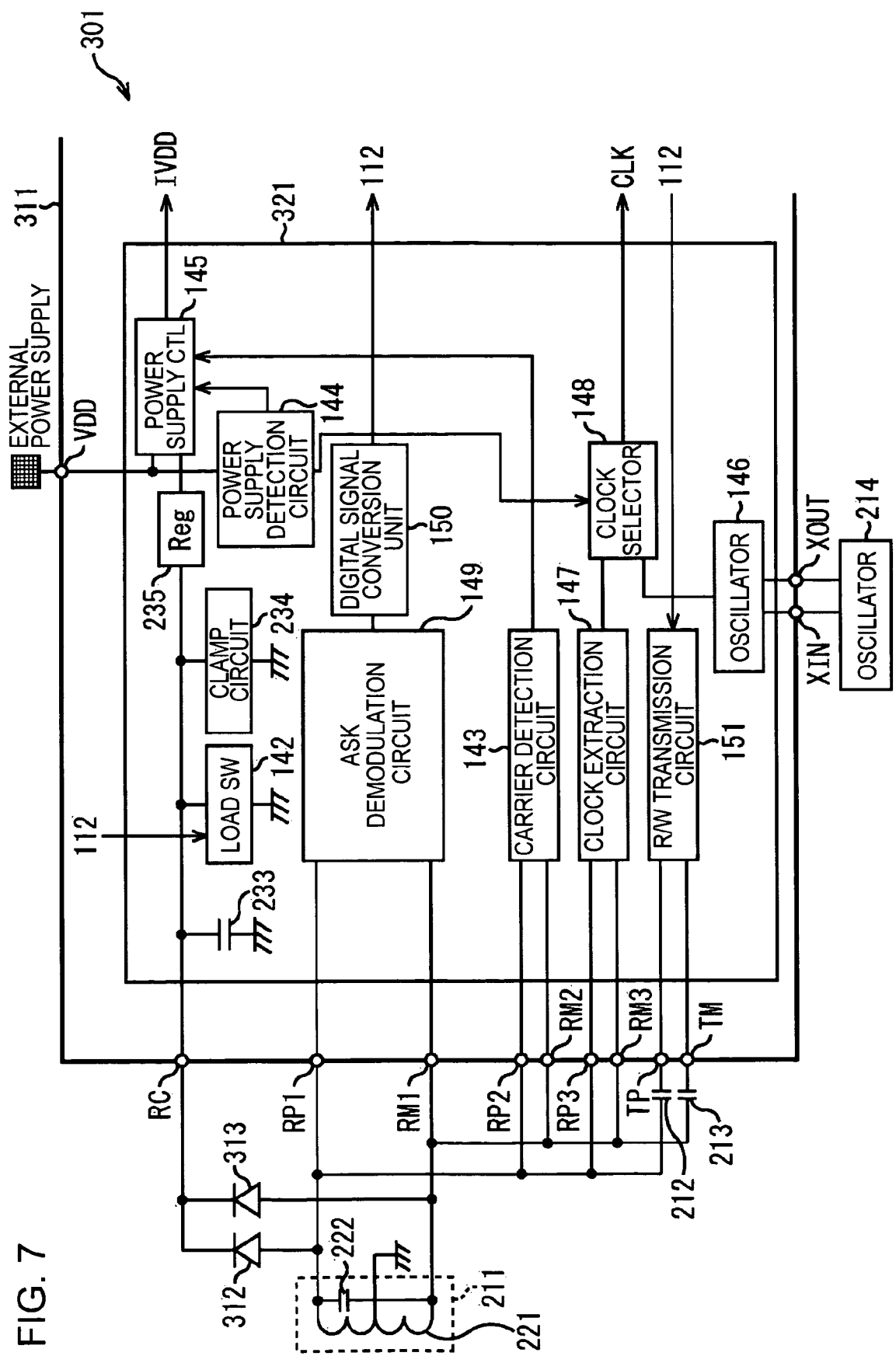
FIG. 7 is a view showing another embodiment of the non-contact IC card reader/writer to which the present invention is applied.

FIG. 7 is a view showing an constitutional example of a non-contact IC card reader/writer 301 which is another embodiment different from the non-contact IC card reader/writer 201 of FIG. 4. The portions in FIG. 7 that correspond to those in FIG. 4 are denoted by the same reference numerals and the repeated description thereof is appropriately omitted.

The non-contact IC card reader/writer 301 is different from the non-contact IC card reader/writer 201 of FIG. 4 in that the semiconductor integrated circuit 101 is replaced with a semiconductor integrated circuit 311, diodes 312 and 313 are additionally provided, and an intermediate tap of an antenna 211 is grounded.

The semiconductor integrated circuit 311 is different from the semiconductor integrated circuit 101 of FIG. 4 in that the analog front end section 111 is replaced with an analog front end section 321. Note that although FIG. 7 shows only the analog front end section 321 as a section of the semiconductor integrated circuit 311 and the other sections are omitted likewise FIG. 4, the sections whose illustration is omitted are arranged similarly to the semiconductor integrated circuit 101 shown in FIG. 3. The analog front end section 321 is different from the analog front end section 111 of FIG. 4 in that it is not provided with the diodes 231 and 232.

An anode of the diode 312 is connected to an external terminal RP1 and a cathode thereof is connected to an external terminal RC. An anode of the diode 313 is connected to an external terminal RM1 and a cathode thereof is connected to the external terminal RC. With this arrangement, in the non-contact IC card reader/writer 301, an full-wave rectification and smoothing circuit is composed of the diodes 312 and 313 connected to the outside of the semiconductor integrated circuit 311 and a capacitor 233 of the semiconductor integrated circuit 311 in place of the full-wave rectification and smoothing circuit composed of the diodes 231 and 232 and the capacitor 233 of the analog front end section 111 in the non-contact IC card reader/writer 201 of FIG. 4. The semiconductor integrated circuit 311 can be designed more easily and more reduced in size than the semiconductor integrated circuit 101 of FIG. 4 by disposing the diodes 312 and 313 to the outside.

Figure 8:
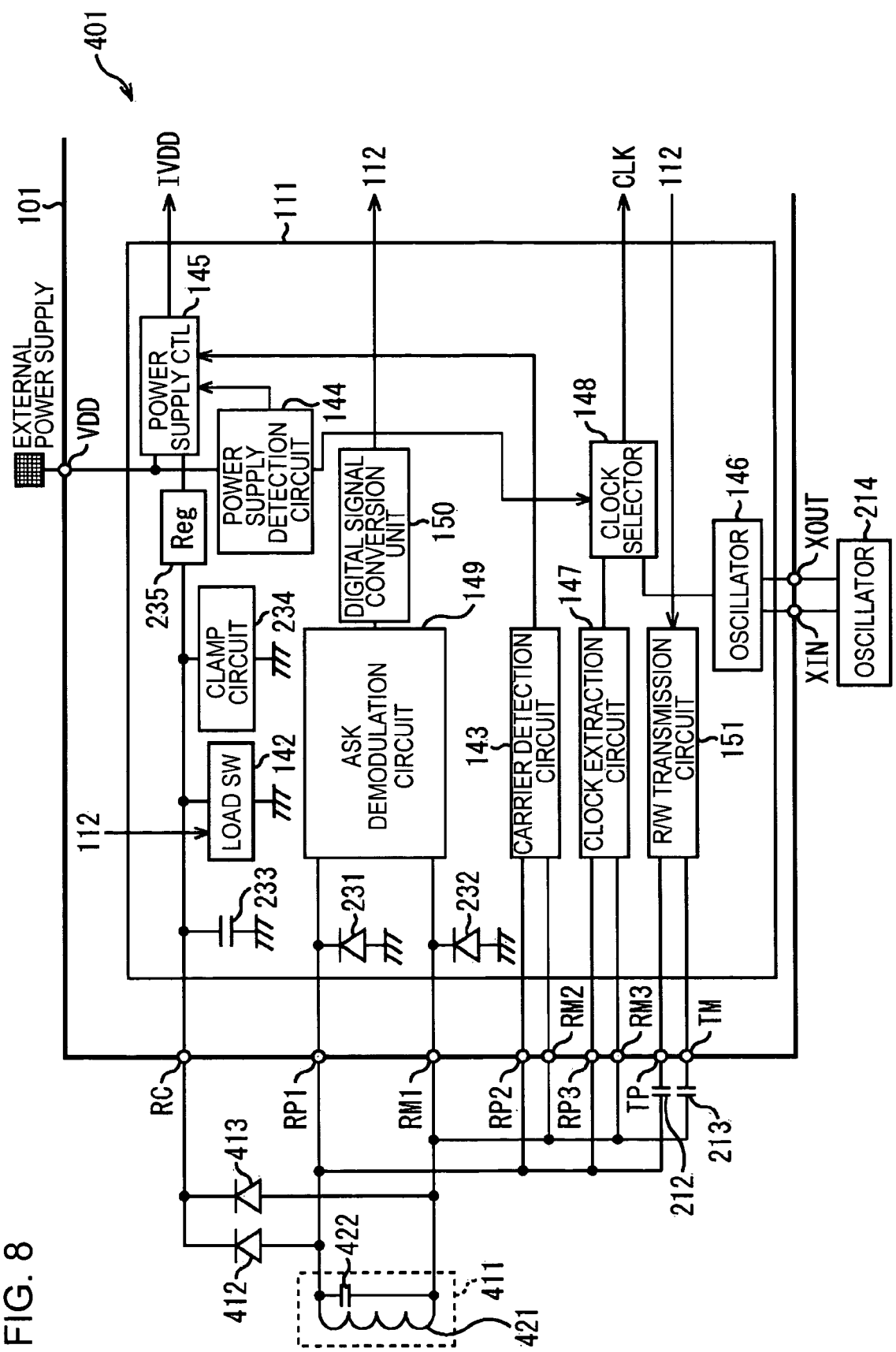
FIG. 8 is a view showing still another embodiment of the non-contact IC card reader/writer to which the present invention is applied.

FIG. 8 is a view showing a constitutional example of a non-contact IC card reader/writer 401 which is still another embodiment different from the non-contact IC card reader/writer 201 of FIG. 4. The portions in FIG. 8 that correspond to those in FIG. 4 are denoted by the same reference numerals and the repeated description thereof is appropriately omitted.

The non-contact IC card reader/writer 401 is different from the non-contact IC card reader/writer 201 of FIG. 4 in that the antenna 211 is replaced with an antenna 411 having a resonant circuit composed of a loop coil 421 and a capacitor 422, and diodes 412 and 413 are additionally provided.

An anode of the diode 412 is connected to an external terminal RP1 and a cathode thereof is connected to an external terminal RC. An anode of the diode 413 is connected to an external terminal RM1 and a cathode thereof is connected to the external terminal RC. With this arrangement, in the non-contact IC card reader/writer 401, a bridge type full-wave rectification and smoothing circuit is composed of diodes 231 and 232 and a capacitor 233 of an analog front end section 111 as well as the diodes 412 and 413 disposed to the outside of a semiconductor integrated circuit 101 in place of the center-tap type full-wave rectification and smoothing circuit composed of the diodes 231 and 232 and the capacitor 233 of the analog front end section 111 in the non-contact IC card reader/writer 201 of FIG. 4.

With this arrangement, it is not necessary to provide the intermediate tap disposed to the antenna 211 of FIG. 4 in the non-contact IC card reader/writer 401 as shown in the antenna 411, thereby the antenna 411 has an increased degree of freedom in design and can minutely adjust the number of windings of the loop coil 421, and the like as compared with antenna 211.

Figure 9:
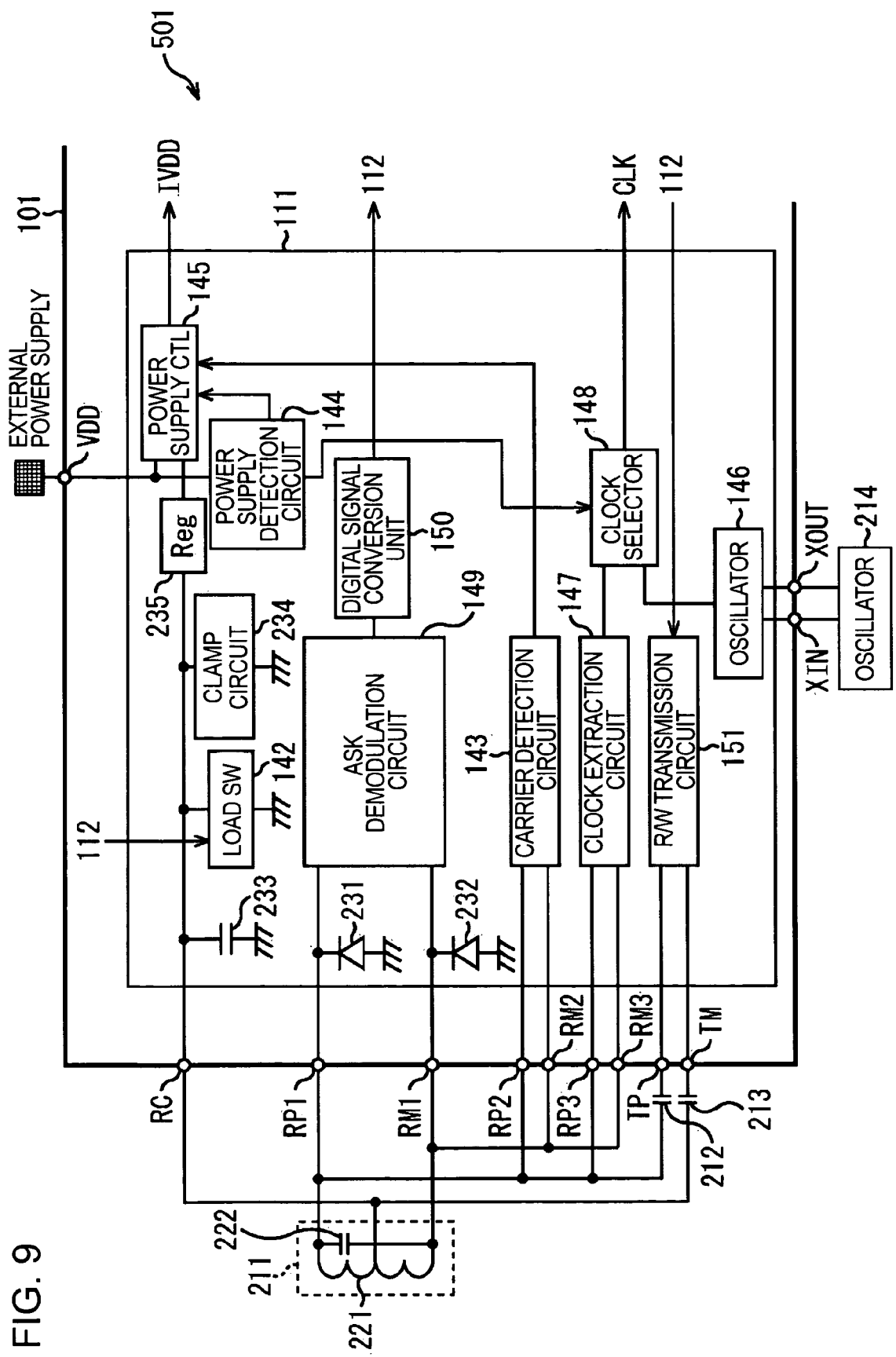
FIG. 9 is a view showing yet still another embodiment of the non-contact IC card reader/writer to which the present invention is applied.

FIG. 9 is a view showing a constitutional example of a non-contact IC card reader/writer 501 which is a further embodiment different from the non-contact IC card reader/writer 201 of FIG. 4. The portions in FIG. 9 that correspond to those in FIG. 4 are denoted by the same reference numerals and the repeated description thereof is appropriately omitted.

The non-contact IC card reader/writer 501 is different from the non-contact IC card reader/writer 201 of FIG. 4 in that an end of a capacitor 213 different from the terminal thereof connected to an external terminal TM is connected to an intermediate tap of an antenna 211.

With this arrangement, when a reader/writer transmission circuit 151 of FIG. 9 drives the antenna 211, a current flows only to a half of the windings of a loop coil 221 of the antenna 211. As a result, when the antenna 211 is driven by flowing the same current as the reader/writer transmission circuit 151 in FIG. 4, the drive capability of the reader/writer transmission circuit 151 can be suppressed to one half. Further, a current also flows to the remaining half of the loop coil 221 of the antenna 211 by electromagnetic induction, thereby the transmission efficiency of a reader/writer function can be improved by the secondary radiation.

Figure 10:
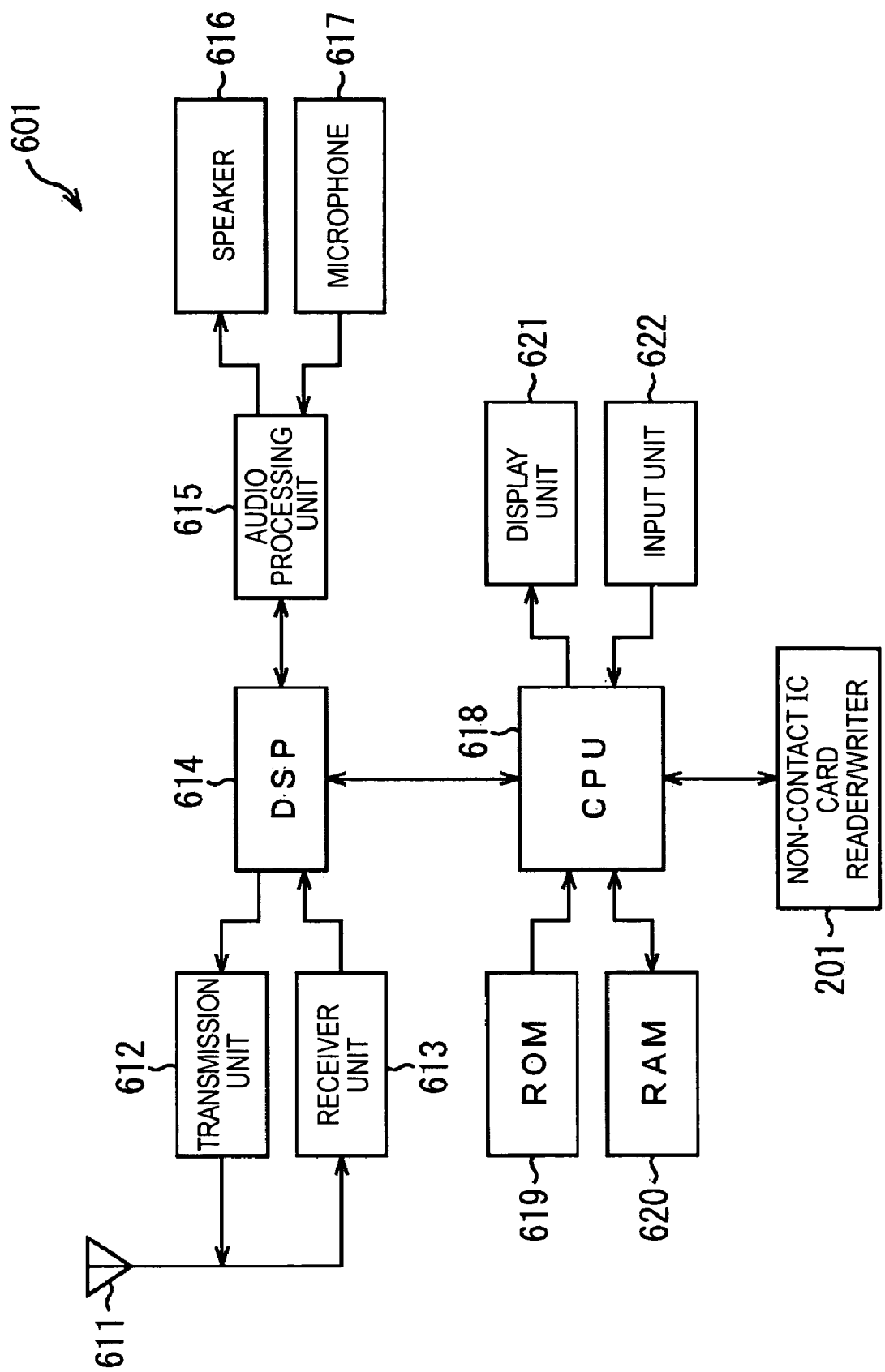
FIG. 10 is a block diagram showing an embodiment of a mobile phone to which the present invention is applied.

FIG. 10 is a block diagram showing a constitutional example of a mobile phone 601 using the non-contact IC card reader/writer 201 of FIG. 4.

A CPU 618 extends a control program stored in a ROM (Read Only Memory) 619 into a RAM (random Access Memory) 620 and controls the operation of the mobile phone 601 in its entirety according to the control program. For example, the CPU 618 controls a DSP (Digital Signal Processor) 614 based on an instruction from a user and transmits and receives various kinds of information such as audio information and the like to and from a base station.

Further, the CPU 618 is connected to the non-contact IC card reader/writer 201 through terminals TXD and RXD (FIG. 3). The CPU 618 can rewrite and read the data stored in the non-contact IC card reader/writer 201 in place of the external reader/writer based on an instruction from the user.

Further, the CPU 618 causes the non-contact IC card reader/writer 201 to operate as a reader/writer based on an instruction from the user to thereby cause the non-contact IC card reader/writer 201 to carry out short distance wireless communication with an IC card placed in the vicinity of it making use of electromagnetic induction.

Communication is carried out in a transmission unit 612 and a receiver unit 613 based on, for example, PDC (Personal Digital Cellular) system, or W-CDMA (Wideband-Code Division Multiple Access) system.

When audio information is supplied to the transmission unit 612 from the DSP 614, the transmission unit 612 subjects the audio signal to predetermined processing such as analog to digital conversion processing, frequency conversion processing, and the like, and transmits a resultant audio signal from an antenna 611 through a radio channel having a predetermined transmission carrier frequency selected by the base station.

In for example, an audio phone call mode, the receiver unit 613 amplifies the RF signal received by the antenna 611, subjects it to predetermined processing such as frequency conversion processing, analog to digital conversion processing, and the like, and outputs resultant audio information to the DSP 614.

The DSP 614 subjects the audio information supplied thereto from the receiver unit 613 to, for example, spectrum inverse-diffusion processing, and outputs resultant data to an audio processing unit 615. Further, the DSP 614 subjects the audio information supplied thereto from the audio processing unit 615 to spectrum diffusion processing, and outputs resultant data to the audio processing unit 612.

The audio processing unit 615 converts a user's voice collected by a microphone 617 into audio information and outputs it to the DSP 614. Further, the audio processing unit 615 converts the audio information supplied thereto from the DSP 614 to an analog audio signal and outputs a corresponding audio signal from a speaker 616.

A display unit 612 is composed of an LCD (Liquid Crystal Display) and the like and displays a corresponding screen based on the information supplied from the CPU 618. An input unit 622 detects an input from a user to various buttons such as ten keys, a phone call button, a power supply button, and the like disposed on the surface of a cabinet of the mobile phone 601 and outputs a corresponding signal to the CPU 618.

Note that the mobile phone 601 may employ the non-contact IC card reader/writer 301, 401, or 501 in place of the non-contact IC card reader/writer 201.

Although the mobile phone is used as an example in the above description, the present invention may be also applied to other equipment such as wired stationary phone, personal digital assistant as small information equipment, watch, computer, and the like on which the non-contact IC card function and the non-contact IC card wireless reader/writer function can be mounted when these functions are mounted on the equipment. Note that the equipment may be provided with a wired or wireless communication function other than the communication functions of the non-contact IC card and the reader/writer.

Further, an IC for non-contact IC card and reader/writer or a module of a combination of an IC for non-contact IC card and reader/writer and an antenna, and the like may be detachably mounted on or incorporated in the equipment. Further, an external storage unit and the like such as an IC card, a memory card, and the like, in which the IC for non-contact IC card and reader/writer or the module of combination of the IC for non-contact IC card and reader/writer, the antenna, and the like is incorporated, may be detachably mounted on the equipment.

As described above, when a first received signal, which is transmitted from a wireless reader/writer and received through the antenna for executing communication with a non-contact IC card or a wireless reader/writer or a second received signal, which is transmitted from the non-contact IC card, is demodulated, the first received signal is full-wave rectified and smoothed, a first transmission signal is transmitted to the wireless reader/writer through an antenna, and a second transmission signal is transmitted to the non-contact IC card through the antenna, communication can be made with an external wireless reader/writer for non-contact IC card and with an external non-contact IC card. Further, a semiconductor integrated circuit having the non-contact IC card function and the wireless reader/writer function for non-contact IC card and a wireless communication terminal can be reduced in size without deteriorating the receiving sensitivity and the transmission efficiency thereof.

The invention claimed is:

1. A wireless communication apparatus with a semiconductor integrated circuit which has a non-contact IC card function and a wireless reader/writer function for a non-contact IC card, comprising:
    an antenna configured to carry out communication with an external non-contact IC card and an external wireless reader/writer, said antenna including a loop of coil with plural windings;
    demodulation means for demodulating a first received signal transmitted from the external wireless reader/writer and received through the antenna or a second received signal transmitted from the external non-contact IC card;
    full-wave rectification and smoothing means for subjecting the first received signal to full-wave rectification and smoothing;
    first transmission means for transmitting a first transmission signal to the external wireless reader/writer through the antenna while the semiconductor integrated circuit is in an non-contact IC card mode of operation;
    second transmission means for transmitting a second transmission signal to the external non-contact IC card through the antenna while the semiconductor integrated circuit is in a wireless reader/writer mode of operation; and
    a capacitor connecting the second transmission means to a center tap of the antenna, wherein when the second transmission means drives the antenna, a current from the second transmission means flows only to a half of the windings of the loop of coil of the antenna and an another current flows through a remaining portion of the loop of coil by electromagnetic induction.

2. A wireless communication apparatus according to claim 1, further comprising stabilization means for stabilizing the power obtained from the first received signal subjected to the full-wave rectification and smoothing by the full-wave rectification and smoothing means.

3. A wireless communication apparatus according to claim 1, wherein the first transmission means is connected behind the full-wave rectification and smoothing means as well as transmits the first transmission signal by changing a load of an antenna of the external wireless reader/writer electromagnetically coupled with the antenna.

4. A wireless communication apparatus according to claim 1, wherein the second transmission means transmits the second transmission signal that is a differential signal created based on a transmission carrier signal having a predetermined frequency and data to be transmitted to the external non-contact IC card.

5. A wireless communication apparatus according to claim 1, wherein the demodulation means demodulates the first received signal as a differential signal or the second received signal as the differential signal.

6. A wireless communication apparatus of claim 1, further comprising:
  a battery;
  a power supply control unit configured to supply power to components of the wireless communication apparatus received from the external wireless reader/writer while the wireless communication apparatus is in the non-contact IC card mode of operation, and to supply power to components of the wireless communication apparatus from the battery while the wireless communication apparatus is in the wireless reader/writer mode of operation.

7. A wireless communication apparatus of claim 6, wherein the power supply control unit is further configured to provide power to components of the wireless communication apparatus from both the battery and from the external wireless reader/writer while the wireless communication apparatus is in the non-contact IC card mode of operation.

8. A wireless communication apparatus which has a non-contact IC card function and a wireless reader/writer function for non-contact IC card comprising:
  an antenna configured to carry out communication with an external non-contact IC card and an external wireless reader/writer;
  a demodulation unit configured to demodulate for demodulating a first received signal transmitted from the external wireless reader/writer and received through the antenna or a second received signal transmitted from the external non-contact IC card and received through the antenna;
  a full-wave rectification and smoothing unit configured to subject the first received signal to full-wave rectification and smoothing;
  a first transmission unit configured to transmit a first transmission signal to the external wireless reader/writer through the antenna while the wireless communication apparatus is in an non-contact IC card mode of operation;
  a second transmission unit configured to transmit a second transmission signal to the external non-contact IC card through the antenna while the wireless communication apparatus is in an wireless reader/writer mode of operation; and
  a capacitor connecting the second transmission unit a center tap of the antenna, wherein when the second transmission unit drives the antenna, a current from the second transmission unit flows only to a half of the windings of the loop of coil of the antenna and an another current flows through a remaining portion of the loop of coil by electromagnetic induction.

9. A wireless communication apparatus of claim 8, further comprising:
  a battery;
  a power supply control unit configured to supply power to components of the wireless communication apparatus received from the external wireless reader/writer while the wireless communication apparatus is in the non-contact IC card mode of operation, and to supply power to components of the wireless communication apparatus from the battery while the wireless communication apparatus is in the wireless reader/writer mode of operation.

10. A wireless communication apparatus of claim 9, wherein the power supply control unit is further configured to provide power to components of the wireless communication apparatus from both the battery and from the external wireless reader/writer while the wireless communication apparatus is in the non-contact IC card mode of operation.

* * * * *